Jan. 2, 1945.  H. B. COMFORT  2,366,385
ANGLE PLATE
Filed Aug. 13, 1943   2 Sheets-Sheet 2
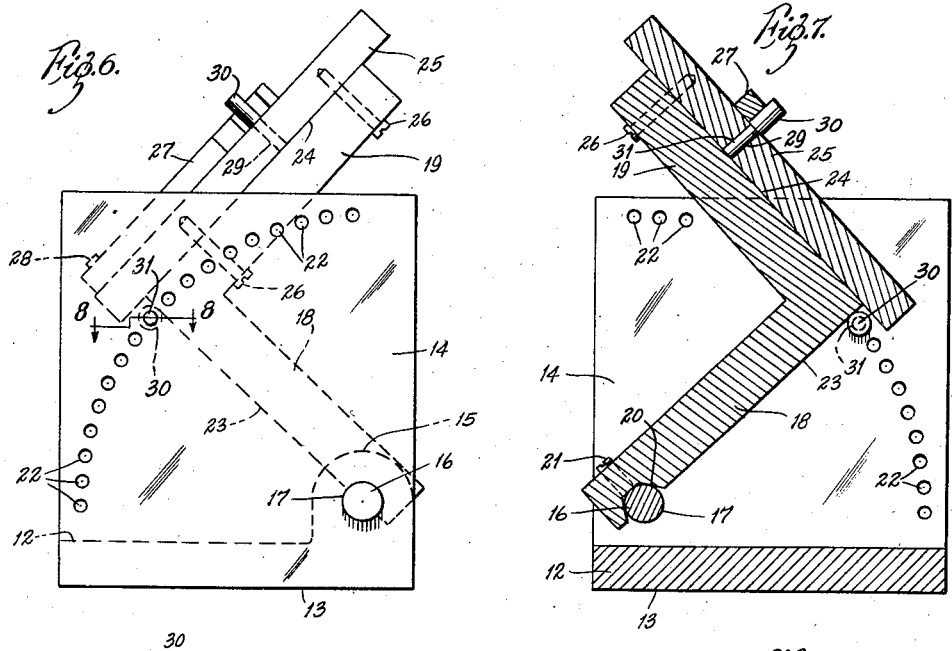
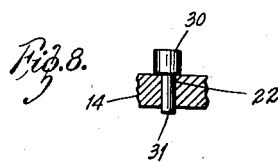
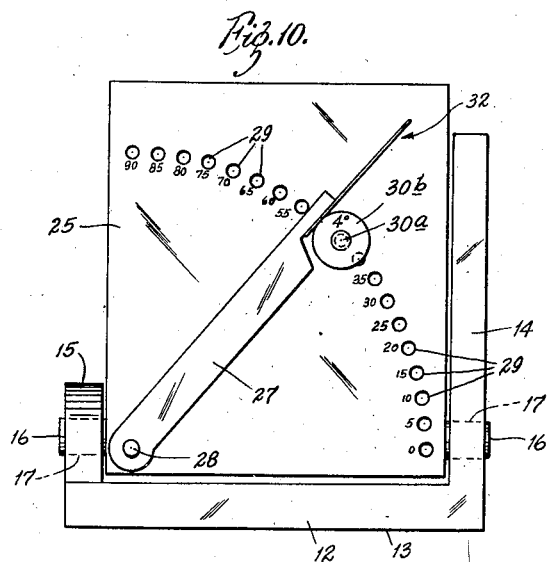
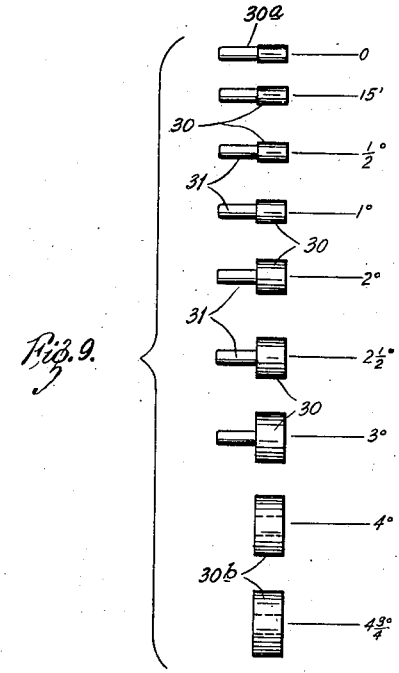
INVENTOR:
HARRY B. COMFORT,
BY Lawrence H. Cohn
ATTORNEY.

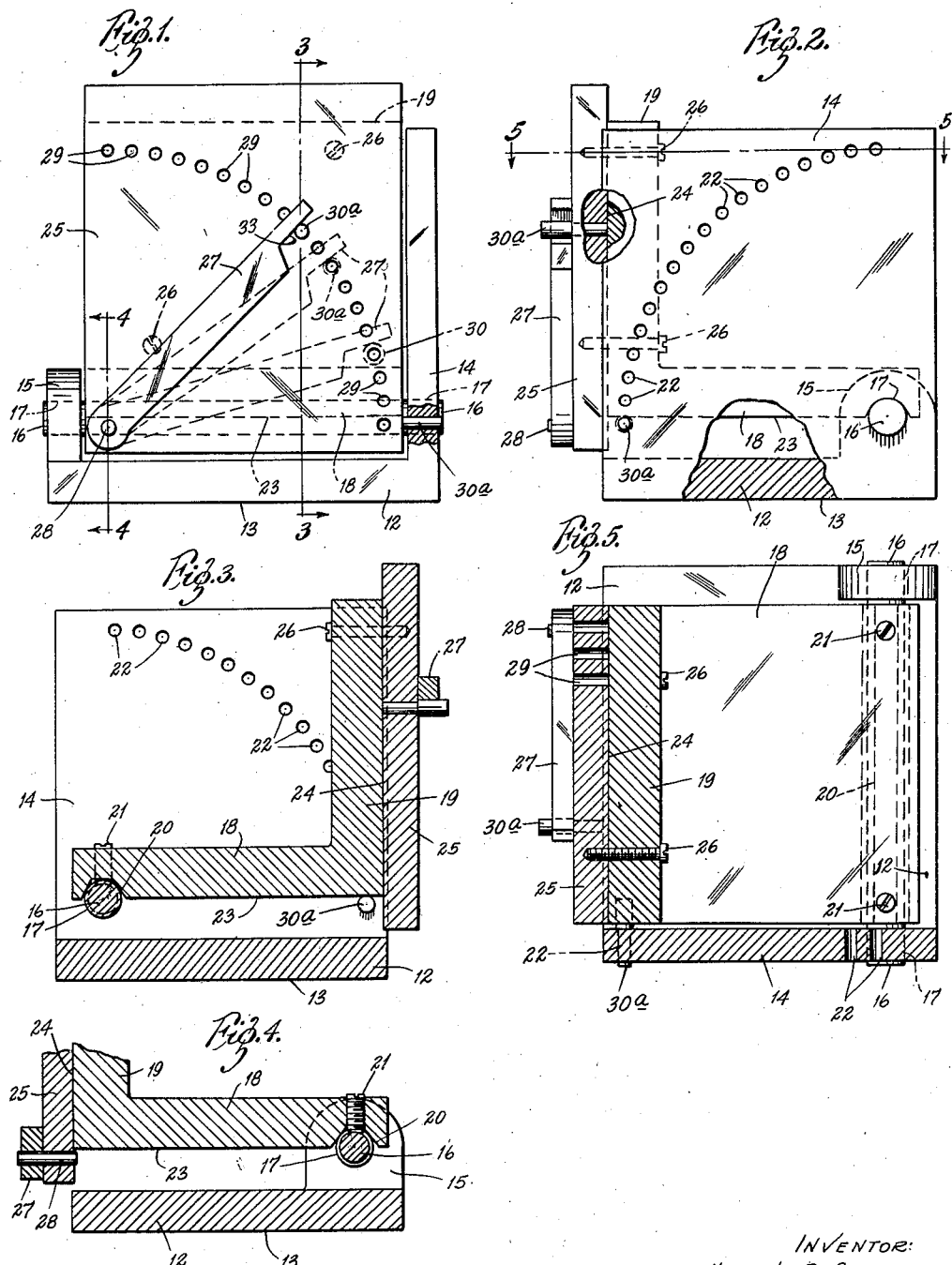

Patented Jan. 2, 1945

2,366,385

UNITED STATES PATENT OFFICE 2,366,385

ANGLE PLATE

Harry B. Comfort, Webster Groves, Mo.

Application August 13, 1943, Serial No. 498,549

6 Claims. (Cl. 33—174)

This invention relates to improvements in angle plates for holding work pieces in angular positions for lay-out or machining purposes, and the principal object of my invention is to provide an improved device of this character which simplifies and facilitates the operation of setting up a work piece in a predetermined angular position.

With devices of this character which are now on the market and available to tool and die makers considerable time and much experience is required in order to effect an accurate angular setting of the member which holds and positions the work. The chief reason for the stated deficiency of former devices is that settings thereof require the use of a height gage or other measuring instrument which must be adjusted pursuant to a trigonometric determination and applied with great nicety and precision to gage points on the device.

The principal object of my invention is achieved in the provision of an improved angle forming device wherein angular positions of the work holding member or index arm are determined mechanically and by means of a simple character which can be used by any novice or apprentice without previous experience. A further advantage is that the involvement of the human element which is the chief cause for error in the operation of former devices is largely eliminated by the device of my invention, and the extreme simplicity of its operating method effects a considerable saving of the mechanic's time.

These and other objects and advantages will appear from the following description and accompanying drawings of a device embodying my invention, wherein:

Fig. 1 is a front elevational view;

Fig. 2 is a side elevational view;

Fig. 3 is a sectional view taken at line 3—3 of Fig. 1;

Fig. 4 is a sectional view taken at 4—4 of Fig. 1;

Fig. 5 is a sectional view taken at 5—5 of Fig. 2;

Fig. 6 is a side view showing the work holding plate in an angular position;

Fig. 7 is a sectional view similar to Fig. 3, but with the work holding plate disposed in the angular position of Fig. 6;

Fig. 8 is a sectional view taken at 8—8 of Fig. 6, and illustrates one of the gage elements in position;

Fig. 9 represents a number of the gage elements, and

Fig. 10 illustrates the use of a gage element of different form for effecting factional degree settings.

Referring now by characters of reference to the drawings, the angle plate of my invention essentially consists of a plate member 25, preferably rectangular in form as shown, and having a front surface which is flat and smooth. On the flat front surface of plate 25 there is formed a graduated circular arc, such arc being defined by a series of uniformly spaced holes 29, each thereof being centered at one of the major angular divisions or graduations of the arc. These holes provide sockets for the mounting on the plate of cylindrical gage elements, to be hereinafter described, and the holes are accurately drilled so that their axes extend precisely at right angles to the planar front surface of the plate. In stating that the socket holes 29 are located at the major divisions or angular graduations of the arc it is assumed that such major divisions occur at intervals of between one and ten degrees. In the embodiment of my invention illustrated herein the holes are spaced at five degree intervals, such spacing having been determined to be most suitable for an angle plate of practical working size. As appears in Fig. 10 each hole is provided with a designation of its angular value.

A drill hole at the center of curvature of the graduated arc is provided for the reception of a pin 28, on which pin is pivotally mounted an index member or angle bar 27. The inner surface of bar 27 is flat and smooth so as to make flat, full surface contact with the face of the plate, and the upper and lower edges of the bar are straight and parallel. At its outer end the bar is preferably recessed to provide an indented lower edge 33, such edge extending across the graduated arc in parallel relation to the upper edge of the bar.

The bar 27 is adapted to be set in any desired angular position within the range of the arc by means of gage elements of the character illustrated in Fig. 9. These gage elements have cylindrical head portions 30, and axially projecting stems 31 sized to fit within the plate holes 29. When a gage head is mounted on the face of the plate in the manner indicated it provides a cylindrical abutment, or stop, which is engageable by the indented edge portion 33 of the angle bar, the point of engagement occurring at the intersection of edge 33 with the graduated circular arc. It will be understood that the angular position of bar 27 under these circumstances is determined by the diameter of the gage cylinder and by the particular hole 29 at which the gage cylinder is located.

There is thus included as an essential part of my invention, a full set of said gage elements, the cylindrical head portions of which are of uniformly graded diameter and serve, in effect, to sub-divide the spaces between consecutive holes 29 of the series so that the bar 27 can be set at any angle to a fineness of a fraction of a degree by means of the cylindrical gages. If it is desired, for example, to provide for angular settings to a closeness of one-quarter of a degree a set consisting of twenty of the described gage elements is required. Such a set will include a so-called zero gage element for positioning the angle bar at the major angular divisions, which, in the present example, occur at 5 degree intervals. It should be mentioned at this point that the shape, size and arrangement of parts is such that when the angle bar is positioned by means of the zero gage element located in the initial or zero degree hole of the series, the upper edge of the angle bar extends parallel with the upper edge of the plate.

To determine the size of the gage elements of the set the radial dimension of the zero gage element is used as a base and each succeeding gage cylinder is increased radially by an amount which is one-twentieth of the length of the arc between five degree graduations, successive gages thereby varying by differences in angular value of one-quarter of a degree. The described gages are suitably marked to designate their angular increment or addendum value. Thus, any of the plate holes 29 may have its angular value increased by mounting in such hole a gage cylinder having the desired angular increment value.

Whereas the majority of the gage cylinders are desirably provided with stems or mounting pins 31 which are integrally formed therewith it has been found expedient from the standpoint of accuracy and ease of manufacture to form the larger sized gage cylinders as collars, and provide separate mounting pins therefor. Such collar type gages are designated 30b in Fig. 9.

In addition to the described cylinder gages, which enable angular settings to a fineness of one-quarter of a degree, or fifteen minutes, to be obtained, there is provided a set of strip type or thickness gages which enable a further subdivision to the order of one-sixtieth of a degree or one minute to be realized. One gage strip of the set thereof will be of thickness which is one-three-hundredths of the arcuate distance between centers of the five degree plate holes, and such strip gage will then have an angular addendum value of one-sixtieth of a degree or one minute. A set of four strip gages of proper thickness to yield angles of one minute, two minutes, four minutes and eight minutes respectively will, when used singly or in combination, be sufficient to yield any angle of from one minute to fifteen minutes. Accordingly, by a proper combination of cylinder and strip gages used in the manner shown in Fig. 10, the strip gage being designated 32, the five degree angular spacings of holes 29 may be broken down to units of one minute.

For example, where it is desired to set the angle bar 27 at an angle of 29° 57′ the 4¾° (four degrees, forty-five minutes) cylinder gage is selected from the set and inserted in the plate hole marked 25°, thus providing for an angular setting of 29° 56′. The additional 12′ minutes are obtained by combining the 8′ and 4′ strip gages and placing them between the adjacent surface of the angle bar and cylinder gage, in the manner illustrated in Fig. 10; and the angular setting of the example is obtained.

The described angle plate is provided with suitable means whereby it may be attached to any of the various types of angulate base blocks, so-called tool-makers knees, or the like, so to provide such articles with the angle setting facilities of my invention.

In the accompanying drawings the angle plate 25 is shown to be mounted on an improved adjustable base or mounting structure whereby accurate angular settings for two directions of inclination may be obtained. Such base structure comprises a stationary support consisting of a horizontal plate member 12 and a bracket plate 14, these members being fixedly united together at right angles. Mounted for pivotal movement on the stationary support is an angularly adjustable member having plate-like arm portions 18 and 19 extending at right angles to each other. Pivot means for the adjustable plate member 14—15 includes a shaft 16 which extends parallel to the bottom surface 13 of base member 12 and at right angles to member 14. The opposite ends of shaft 16 are seated in alined bearing apertures 17, one formed in vertical plate member 14 and the other in a bearing lug 15 on the horizontal plate member 12. The plate member 18 is provided with a groove 20 that parallels the outer face of plate 19 and such groove accommodates shaft 16 which is fixedly secured therein by screws 21. The described mounting provisions for plate 19 enable it to be disposed in various angular positions.

Means for setting the adjustable plate 19 in definite predetermined angular positions are provided, such means being similar to those described in connection with the angle bar 27. Thus, plate 14 is provided with an arcuate series of holes 22 for the reception of stems 31 of cylindrical gage elements 30. The series of holes 22 are in every respect identical with the series of holes 29 in plate 25, previously described, so that the same set of gage elements may be employed to effect accurate angular settings for both of the adjustable parts, to wit, the angle bar 27 and the plate member 19.

The manner in which the cylindrical gages 30 are used to fix the angular position of the adjustable plate structure 18—19 is best illustrated in Figs. 3, 6 and 7. With reference to Fig. 3 a zero gage cylinder 30a is shown mounted in the initial or zero degree hole to provide a supporting abutment for plate 18. Such condition provides for a right angular relationship between bottom surface 13 of plate 12 and front surface 24 of plate 19. The surface plate 25 with its angularly settable bar 27 is shown to be detachably secured to plate 19 by means of screws 26.

The angle forming device of my invention may be employed in a variety of useful ways in the machine shop and tool room. Its principal application is for holding a work piece at a predetermined angle for machining purposes. This is accomplished by utilizing the pre-set angle bar 27 as a shelf to position the work piece, which is then tightly clamped by suitable means to the plate 25.

From the foregoing description it will appear that angular settings of the bar 27 may be accurately and quickly obtained by the means of my invention.

What I claim and desire to secure by Letters Patent is:

1. An angle forming device of the character described comprising a base, a plate member carried thereby, said plate member having a plane front surface and a graduated circular arc defined thereon by a series of holes in the plate, each hole being centered at one of the major divisions or graduations of the arc, an angle bar pivotally mounted on the front surface of said plate on an axis coincident with the center of said arc, a set of cylindrical gage elements of graded diameter, successive elements of the set differing in radial dimension by a distance which, on said circular arc, corresponds to a fraction of one degree, and gage mounting pins disposable in said holes, whereby any selected one of said gage cylinders may be mounted on the front surface of said plate coaxially with any selected one of said holes, such that selected gage cylinder provides an abutment for one side of said angle bar and serves to fix the angular position thereof.

2. An angle forming device of the character described comprising a base, a plate having a planar front surface and a graduated circular arc thereon, defined by a series of cylindrical socket recesses, each thereof centered at one of the major divisions or graduations of said arc, an angle bar pivotally mounted on the front surface of said plate at the center of said circular arc, a set of gage elements consisting of cylinders of graded radial dimensions, the radial differential between successive elements of the set being uniform and a fractional part of the arcuate distance between centers of adjacent said holes, and means for mounting any selected one of said gage cylinders coaxial with any selected socket recess, such that the mounted gage cylinder provides an abutment for one side of said angle bar and serves to establish the angular position thereof.

3. In an angle forming device of the character described, a flat surface plate having a graduated circular arc defined thereon by a series of holes in the plate, each hole having its center located at one of the major divisions or graduations of said arc, an angle bar pivotally mounted on said plate on an axis coincident with the center of said arc, and means for setting said angle bar in any predetermined angular position within the scope of said arc, said means including a set of cylindrical gage elements, each having a mounting pin adapted to seat in any one of said holes, and a cylindrical head portion adapted, when mounted on the plate by its pin, to provide a lateral abutment for said angle bar, the cylindrical head portions being of uniformly graded diameter and successive ones of the set differing in radial dimension by a distance which, on said circular arc, corresponds to a fraction of one degree; said means further including a plurality of flat gage strips adapted for application, individually or in stacked combination, between the angle bar and one of said cylindrical gages, the thickness of each of said strip gages being a fractional part of the differential between radii of successive cylindrical gages.

4. An angle forming device of the character described comprising a base, a plate, means mounting said plate onto said base for angular adjustment relative thereto, said means including a pivot pin extending parallel to said plate, a bar pivoted for angular movement on a flat front surface of said plate, the pivotal axis of said bar extending at right angles to the pivotal mounting axis of said plate, said plate having a series of holes spaced at equal angular intervals along a circular arc described about the pivotal axis of said bar, means for fixing the angular position of said bar on said plate, said means including a set of cylindrical gages of graded diameter, succesive elements of the set differing in radial dimension by a small fractional part of the arcuate distance between centers of successive holes of said series, and gage mounting pins disposable in said holes, whereby any selected gage element may be mounted on the front surface of said plate coaxially with any selected hole of said series, such that the selected gage provides an abutment for one side of said bar.

5. In an angle setting device of the character described, a base, a rigid plate-like member carried by said base and having one face thereof characterized by a true planar surface, at least one marginal edge of said member at said face, being of rectilinear extent, an angle-setting arm, a pivot on said member adjacent one end of said marginal edge, said pivot supporting said arm for swinging movement over said planar face, said member being provided with a plurality of recesses in said face, arranged in an arc extending from adjacent the opposite end of said marginal edge and having its center coincident with the axis of said pivot, said recesses being equally spaced angularly to the extent of five degrees, and a set of differential stop elements providing generally cylindrical abutments of graded diameter, adapted for engagement with said arm, said stop elements being selectable for positionment selectively, in said recesses for abutment by said arm to determine thereby and in accordance with the selection of said stop elements, the angular position of said arm relative to said rectilinear marginal edge, in multiples of five degrees and in multiples of five degrees plus increments of less than five degrees.

6. An angle forming device of the character described comprising a base having a bracket plate extending vertically therefrom, an angularly adjustable support pivoted to said base, the pivotal axis of said support extending at right angles to said bracket plate, a surface plate carried by said support, an angularly adjustable bar mounted on the face of said surface plate and pivoted thereto, the axis of bar movement extending at right angles to the axis of movement of the surface plate, said surface plate and said bracket plate each having a series of equally spaced holes extending along arcuate paths of equal radius, the centers of said arcuate paths being located at the pivotal axes of said bar and said surface plate respectively, each of said holes identifying a particular angular position of the pivoted member related thereto, and cylindrical stop elements adapted to be selectively positioned in said holes and to project therefrom into the paths of movement of said support and said bar, whereby to engage the sides of these members and to fix their respective angular positions, said stop elements having cylindrical abutment heads of graded diameter for effecting settings of said pivoted members at various angles embraced between particular angles identified with said holes.

HARRY B. COMFORT.